W. I. KIMBALL.
SPRING WHEEL.
APPLICATION FILED JUNE 1, 1909.
985,039.
Patented Feb. 21, 1911.
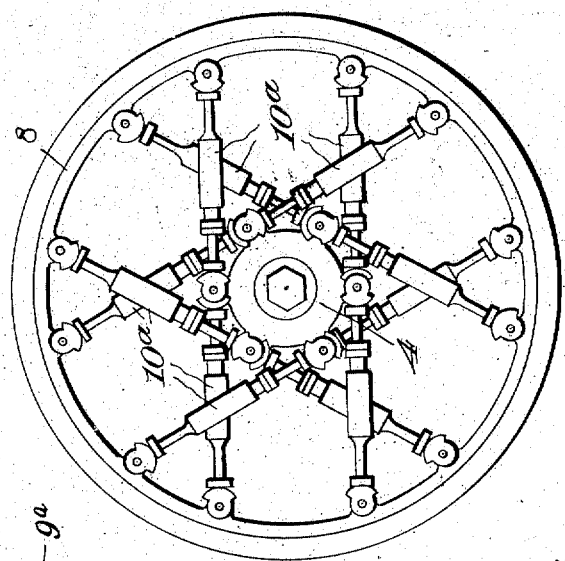
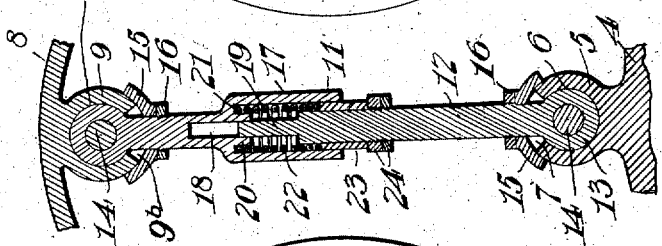
WITNESSES
INVENTOR
William I. Kimball.
By his Attorney

UNITED STATES PATENT OFFICE.

WILLIAM I. KIMBALL, OF LITTLE ROCK, ARKANSAS.

SPRING-WHEEL.

985,039.

Specification of Letters Patent. Patented Feb. 21, 1911.

Application filed June 1, 1909. Serial No. 499,522.

*To all whom it may concern:*

Be it known that I, WILLIAM I. KIMBALL, a citizen of the United States, residing at Little Rock, in the county of Pulaski and State of Arkansas, have invented certain new and useful Improvements in Spring-Wheels, of which the following is a specification.

The present invention relates to vehicle wheels, and more particularly those for automobiles, and similar machines.

The principal object is to provide a simple, novel and practical structure in which the wheel itself is made yielding, as distinguished from a yielding tire, so that the shocks and jars are properly absorbed, while more permanent tires can be employed than is now possible.

Two embodiments are disclosed in the accompanying drawings, wherein—

Figure 1 is a side elevation of one form of wheel. Fig. 2 is a longitudinal sectional view on an enlarged scale, through one of the spokes, and its connection with the hub and rim. Fig. 3 is a side elevation of a slightly modified form of construction, showing a different arrangement of the spokes.

Similar reference numerals designate corresponding parts in all the figures of the drawings.

In the embodiment disclosed, a hub 4 is employed that is provided with a plurality of outstanding curved heads 5 having circular sockets 6 therein and slots 7 that communicate with the sockets. A rim 8 of any desired character surrounds the hub, and is provided on its inner side with curved heads 9 having circular sockets 9ª and slots 9ᵇ that communicate with the sockets. In the embodiment disclosed in Fig. 1, the rim is supported from and connected to the hub by radially disposed spokes 10, while in Fig. 3, tangentially disposed spokes 10ª are employed. Inasmuch as these spokes are all exactly the same, and perform the same function irrespective of their radial or tangential arrangement, a description of one is believed to be sufficient for all, and the details of one of said spokes is illustrated in Fig. 2. Each spoke, as shown, consists of sections 11 and 12 that have terminal circular ears 13 located respectively in the sockets 9ª and 6, and being pivoted therein, as shown at 14. The said spoke sections extend through the slots 7 and 9ᵇ, and said slots are covered by curved caps 15 carried by the sections and fitting snugly against the outer surfaces of the heads 5 and 9. These caps are maintained in position by suitable nuts 16. It will thus be evident that dust is excluded from the bearings formed by the connection of the spokes with the hub and rim.

One of the head sections, as 11 is provided with a terminal cup 17 and a longitudinally disposed socket 18 located at the inner end of the cup. The other section 12, has its outer end located in the cup, and is provided with a terminal stem 19 that reciprocates in the socket 18. The inner end of said cup is preferably provided with a boss 20, forming a circular seat 21 for the inner end of a coiled spring 22 that is located in the cup and surrounds the portion of the spoke section 12 that is arranged therein. An abutment sleeve 23, slidable upon the section 12, fits in the outer end of the cup 17, and bears against the outer end of the spring 22. This sleeve is maintained in position by jam nuts 24.

The operation of the structure is substantially as follows. As the vehicle moves along, the jolts or shocks imparted to the wheel will be absorbed by the vertical spokes, while those that are disposed in a horizontal or inclined position, will rotate on their pivots, thus permitting the necessary movement to take place. Inasmuch therefore as the necessary yielding action is secured in the wheel itself, it will be obvious that more durable tires can be employed than is the case where the tires yield.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is:—

1. In a wheel, the combination with a hub and a rim, of yieldingly extensible spokes, said hub and rim having offset heads provided with circular sockets, the ends of the spokes having circular ears that are pivoted in the sockets, and caps secured to the spokes and slidable upon the heads.

2. In a wheel, the combination with a hub, and a rim surrounding the hub, said rim and hub being provided with circular heads having circular sockets therein, yieldingly extensible spokes having terminal ears that are pivoted in the sockets, curved caps mounted on the spokes and slidable longitudinally thereon, said caps being slidable upon the heads, and nuts threaded on the spokes and bearing against the caps.

In testimony whereof I hereunto affix my signature in the presence of two witnesses.

WILLIAM I. KIMBALL.

Witnesses:
GORDON F. BLACKWOOD,
J. G. DUNAWAY.